United States Patent [19]

Rafter, Sr.

[11] Patent Number: 4,748,778
[45] Date of Patent: Jun. 7, 1988

[54] SEAGULL GUARD

[76] Inventor: Roy L. Rafter, Sr., 640A Baron Ridge Rd., Chester, Md. 21619

[21] Appl. No.: 946,217

[22] Filed: Dec. 24, 1986

[51] Int. Cl.⁴ .................. E04H 9/16; A01K 3/00
[52] U.S. Cl. ........................... 52/101; 52/301; 405/231; 405/255
[58] Field of Search ........... 405/231, 255; 52/102, 52/301, 40; 256/11, 12; 220/95; 441/16, 17

[56] References Cited

U.S. PATENT DOCUMENTS

| 420,491 | 2/1890 | Bryant | 220/95 |
|---|---|---|---|
| 421,199 | 2/1890 | Slaughter | 220/95 |
| 967,211 | 8/1910 | Long | 220/95 |
| 1,004,683 | 10/1911 | Pritchard et al. | 220/95 |
| 1,596,621 | 8/1926 | Omlor | 256/11 |
| 2,142,371 | 1/1939 | Peles | 256/11 |
| 2,258,803 | 10/1941 | Peles | 256/11 |
| 2,298,194 | 10/1942 | Caldwell | 52/101 |
| 2,304,593 | 12/1942 | Peles | 52/101 |
| 2,305,490 | 12/1942 | Perkins | 441/17 |
| 2,361,414 | 10/1944 | Ramsey | 441/17 |
| 2,389,266 | 11/1945 | Marr | 441/17 |
| 2,403,539 | 7/1946 | Mehl | 52/116 |
| 2,989,789 | 6/1961 | Cohn | 52/101 |
| 3,292,319 | 12/1966 | McCarthy | 52/101 |
| 4,110,943 | 9/1978 | Carlson | 256/12 |

FOREIGN PATENT DOCUMENTS 102765 12/1916 United Kingdom ................. 256/11

Primary Examiner—James L. Ridgill, Jr.
Attorney, Agent, or Firm—Henderson & Sturm

[57] ABSTRACT

A seagull guard (10) in combination with a piling (12) wherein the seagull guard (10) comprises at least a pair of elongated generally thin cylindrical guard members (21); whose ends (22) are provided with fastening means (24), for operatively securing the guard members (21) to a piling (12); wherein, the guard members (21) are movable relative to each other and the piling (12).

8 Claims, 1 Drawing Sheet

U.S. Patent  Jun. 7, 1988  4,748,778
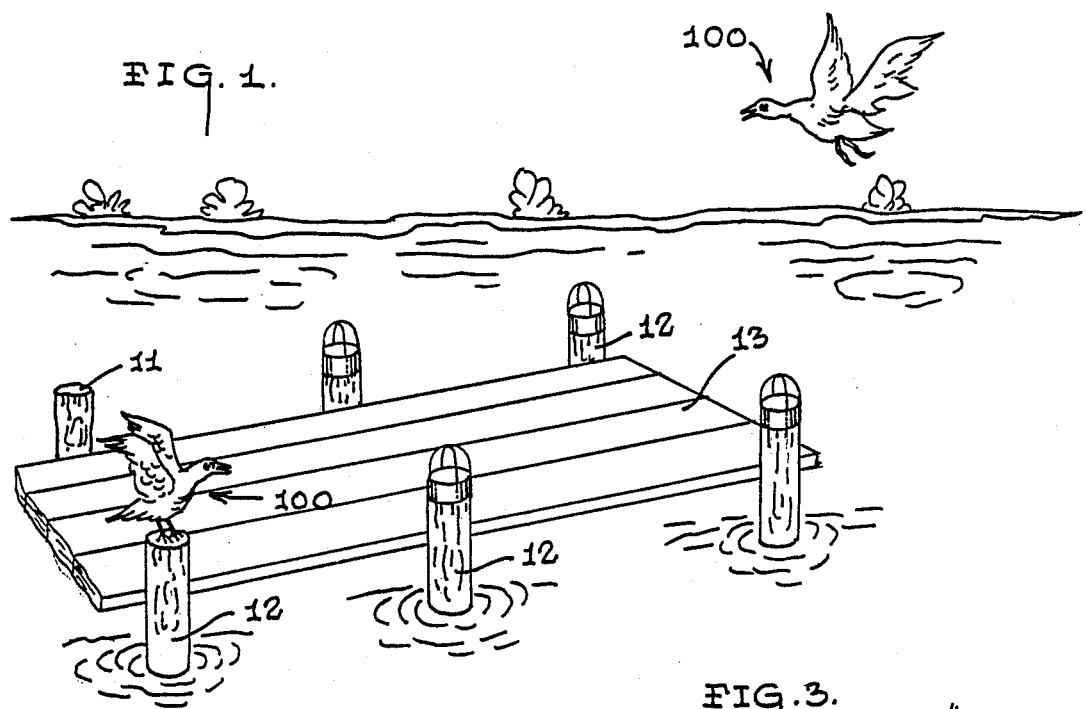
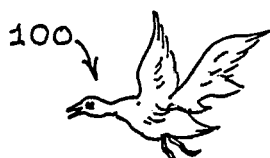
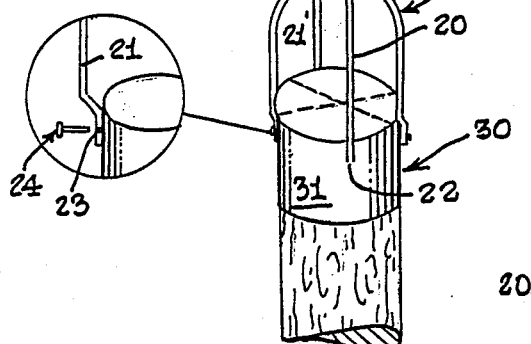
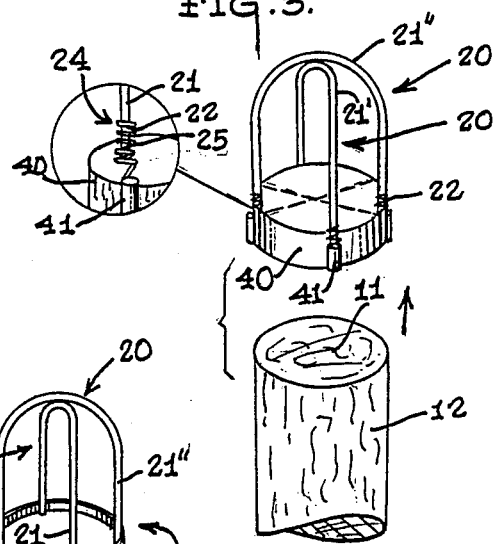
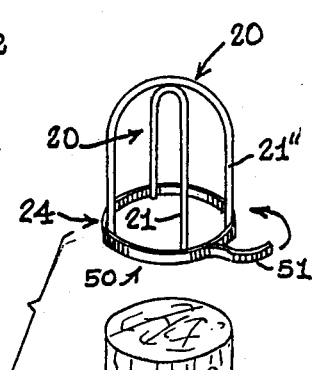
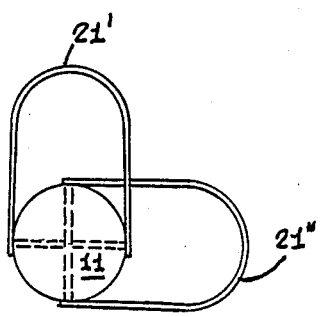
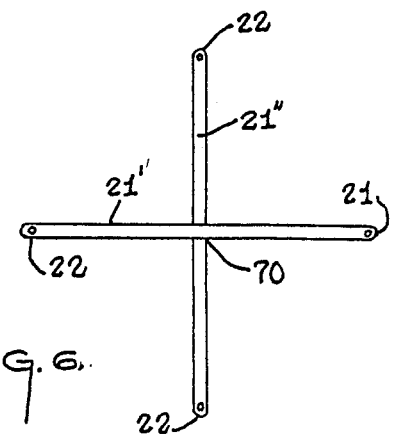

SEAGULL GUARD

TECHNICAL FIELD

The present invention relates generally to protective devices for pilings.

BACKGROUND OF THE INVENTION

Anyone who has spent any amount of time around large bodies of salt or fresh water quickly becomes acutely aware of the problems associated with the natural tendency of marine birds such as seagulls, terns, pelicans and the like to seek elevated perches such as pilings upon which to roost for long periods of time.

An attendent and unavoidable consequence of such long term and repetitive roostings is an accummulation of droppings on the pilings, which is not only unattractive, but extremely unsanitary and potentially hazardous from a public health standpoint.

In addition to the foregoing problems, the frequent users of the piers and docks also find their useful enjoyment of these facilities severely curtailed by the droppings, from the standpoint of their particular recreational or functional requirements.

From a functional standpoint boat owners are constantly faced with having their mooring lines exposed to the droppings anytime that they secure their lines to a piling.

From a recreational standpoint no one likes to spend leisure time fishing, crabbing, or sunning surrounded by pilings that have been fouled by droppings, not to mention the fact that the pilings themselves are rendered unfit for use as resting places for people or equipment.

While anti-roosting and protective piling devices have long been recognized in the prior art as evidenced by the following U.S. Pat. Nos. 3,292,319; 2,142,371; 2,258,803; 2,298,194; and, 2,304,593, up until the development of the present invention, there had been a long felt pressing need for an apparatus that would not only frustrate marine birds from roosting on the pilings; but would also not drastically alter the traditional appearance of the pilings; and, could in some instances preserve the use of the pilings almost exclusively for human as opposed to avian needs.

SUMMARY OF THE INVENTION

The present invention was developed out of a desire to provide a simple, efficient and relatively inexpensive anti-roosting device that could quickly and easily be installed on pilings to prevent marine birds from liting on the pilings and making their deposits.

Another objective of the present invention was to develop a device that while effective, would not materially alter the aesthetic appearance of the pilings.

A still further objective of the present invention was to provide an anti-roosting device that would frustrate relatively heavy bodied birds from landing on the pilings, while still allowing virtually interrupted useful enjoyment of the pilings by humans.

Yet another objective of the present invention was to provide an anti-roosting device that would not create an impediment to the securing of mooring lines to a piling; and, which would also allow the tops of the pilings to be used as a resting place for humans and/or equipment despite the presence or absence of a mooring line being attached to the piling.

The present invention represents the culmination of a trial and error process used to develop an improved seagull guard, and comprises in general a plurality of wire guard units provided with securing means for attaching the wire guard units to a piling; wherein, the wire guard units are optionally provided with mounting means, which allow the individual wire guard units to be moved relative to one another and a piling; whereby, the wire guard units may be temporarily displaced from their operative dispositon, to accommodate the needs of a human as opposed to an avian user.

BRIEF DESCRIPTION OF THE DRAWINGS

These and other objects, advantages, and novel features of the invention will become apparent from the detailed description of the best mode for carrying out the preferred embodiment of this invention which follows; particularly when considered in conjunction with the accompanying drawings, wherein:

FIG. 1 is a perspective view of a pier or dock partially equipped with the seagull guards of this invention;

FIG. 2 is a perspective view of one form of the preferred embodiment of this invention;

FIG. 3 is a perspective view of another form of the preferred embodiment of this invention;

FIG. 4 is a perspective view of yet another form of the preferred embodiment of this invention;

FIG. 5 is a top plan view of the inoperative disposition of at least two forms of the preferred embodiment; and, FIG. 6 is a top plan view of one of the forms of the preferred embodiment prior to installation on a piling.

BEST MODE FOR CARRYING OUT THE INVENTION

As can be seen by reference to the drawings, and in particular to FIG. 1, the seagull guard of this invention is designated generally by the reference numeral (10); and, is intended for use on the tops (11) of pilings (12) associated with a dock or pier (13).

As best depicted in FIGS. 2 and 3, the seagull guard (10) comprises a plurality of guard units (20) that are operatively attached to the individual pilings (12).

In all of the forms of the preferred embodiment illustrated, the wire guard units (20) comprise elongated generally thin cylindrical guard members (21), which may be fabricated from relatively small diameter wire, tubing rods or the like. In addition, the preferred embodiment further contemplates using a minimum of two guard members (21) to produce the desired effect; wherein, the two guard members (21) in their operative mode are disposed generally perpendicular to one another proximate their midpoints.

In the one form of the preferred embodiment illustrated in FIG. 2, the piling (12) is wooden and is provided with a well recognized protective cap member (30) that typically is fashioned from thin sheet metal. In this particular version the ends (22) of the guard members (21) are provided with apertures (23) that are dimensioned to receive fastening means (24) for securing the guard members (21) to the pilings (12), while optionally still allowing the guard members (21) to be moved relative to one another, and to the piling (12).

As clearly shown in FIGS. 2 thru 6, the guard members (21) comprise an inner guard member (21') and an outer guard member (21"); wherein for both aesthetic and functional reasons, the inner guard member (21') has a shorter effective length than the outer guard member (21") as will be explained shortly.

In another form of the preferred embodiment illustrated in FIG. 3, the ends (22) of the guard members (21) are provided with a relatively stiff spring element (25) which is operatively secured to piling (12). The operative securement of the spring element (25) may be effected as depicted in the enlarged portion of FIG. 3; wherein, a collar element (40) is provided with spring receiving receptacles (41) spaced around its periphery; or, the operative securement of the spring element may be effected similar to the arrangement depicted in the enlarged portion of FIG. 2; or, by any other suitable arrangement, wherein the spring element (25) permits the movement of the guard elements (21) relative to one another and the piling (12).

As can best be seen by reference to FIG. 5, the movement of the guard elements (21) relative to one another and to the top (11) of the piling (12) is to allow the guard elements (21') and (21") to be pivoted into a generally horizontal inoperative mode; wherein, the top (11) of the piling (12) may be used as a seat, or for the purpose of resting large pieces of equipment. It should further be appreciated that even in its operative mode, the seagull guard (10) of this invention allows small items to be placed on top of the pilings, by introducing the small items (not shown) through or between the loops formed by the guard members (21')(21").

In yet another form of the preferred embodiment illustrated in FIG. 4, the ends of the guard members (21) are fixedly secured to a strap member (50) wherein the free ends (51) of the strap member (50) are provided with locking means (not shown) for securing the seagull guard (10) to uniform diameter pilings (12), such as would be encountered with concrete pilings or the like.

It should further be noted that in some instances, the user may prefer to install the seagull guard (10) in a permanent, non-movable fashion. As can be seen by reference to FIG. 6, this type of an installation can be produced by welding or otherwise permanently joining (as at 70) the midpoints of the respective guard member (21') (21"); and, then fixedly securing the ends (22) of the guard members (21) to a piling once the guard members have been deformed into loops that will fit over the ends of the pilings.

It should also be noted that the difference in effective length between the guard members (21) should be maintained in both the fixed and movable modes of deployment; so that, the ends (22) of the guard members (21) will be disposed in the same vertical plane on the pilings (12) for aesthetic as well as functional reasons.

Having thereby described the subject matter of this invention, it should be obvious that many substitutions, modifications, and variations of the invention are possible in light of the above teachings. It is therefore to be understood that, the invention as taught and described herein is only to be limited to the extent of the breadth and scope of the appended claims.

I claim:

1. A seagull guard in combination with the top portion of a dock piling; wherein the seagull guard comprises:

a plurality of guard units comprising a pair of inverted generally U-shaped thin cylindrical guard members each having two ends and an intermediate portion wherein the intermediate portions of the guard members in their operative disposition are disposed generally perpendicular to one another; and, fastening means for operatively securing the ends of the guard members to the sides of the top portion of said dock piling.

2. The seagull guard of claim 1; wherein, the said pair of guard members comprise: an inner guard member; and, an outer guard member, wherein the said inner guard member has a shorter effective length than the said outer guard member.

3. The seagull guard of claim 1; wherein, the fastening means operatively secure the ends of the guard members to the pilings; such that the intermediate portions of the guard members are movable relative to one another and to the top portion of said piling.

4. The seagull guard of claim 1; wherein, the ends of the guard members are fixedly secured to said piling.

5. The seagull guard of claim 3; wherein, the ends of the guard members are provided with apertures that are dimensioned to receive said fastening means.

6. The seagull guard of claim 3; wherein, each of the ends of the guard elements are provided with a spring element which is operatively secured to said piling.

7. The seagull guard of claim 3; wherein, the guard members are disposed in a generally vertical orientation in their operative mode.

8. The seagull guard of claim 3; wherein, the guard members are disposed in a generally horizontal orientation in their inoperative mode; whereby, a person may sit on the top portion of said dock piling.

* * * * *